(12) United States Patent
Lan et al.

(10) Patent No.: US 11,231,558 B2
(45) Date of Patent: Jan. 25, 2022

(54) ELECTRONIC DEVICE

(71) Applicants: Wei-Hao Lan, Taipei (TW); Chia-Chi Lin, Miaoli County (TW)

(72) Inventors: Wei-Hao Lan, Taipei (TW); Chia-Chi Lin, Miaoli County (TW)

(73) Assignee: COMPAL ELECTRONICS, INC., Taipei (TW)

( * ) Notice: Subject to any disclaimer, the term of this patent is extended or adjusted under 35 U.S.C. 154(b) by 72 days.

(21) Appl. No.: 16/251,084

(22) Filed: Jan. 18, 2019

(65) Prior Publication Data

US 2019/0219791 A1    Jul. 18, 2019

Related U.S. Application Data

(60) Provisional application No. 62/618,629, filed on Jan. 18, 2018.

(51) Int. Cl.
*G02B 7/02* (2021.01)
*G06F 1/16* (2006.01)

(52) U.S. Cl.
CPC ........... *G02B 7/023* (2013.01); *G06F 1/1609* (2013.01)

(58) Field of Classification Search
CPC .. G02B 7/023; G02B 7/00; G02B 7/02; G06F 1/1609; G06F 1/1616; G06F 1/1686; G06F 1/16; G06F 1/1601; G06F 1/1607; G06F 1/00; G06F 1/1613; G06F 1/1615; G06F 1/162; G06F 1/1622; H04N 5/2257; H04N 5/2251; H04N 5/2252; H04M 1/0264
USPC .... 359/642, 811, 819, 822, 823; 396/73, 75, 396/341, 343, 345, 346, 347, 535, 396/428–429; 348/207.99, 333.01, 33.06, 348/33.08, 37, 373, 207.1, 375, 333.06, 348/374, 376, 14.02, 552, E5.027, 348/E5.042, 335, 36, 39; 361/600, 361/679.01, 679.02, 679.21, 679.26, 361/679.27, 679.55, 679.3, 809; 455/556.1, 575.3
See application file for complete search history.

(56) References Cited

U.S. PATENT DOCUMENTS

| | | | |
|---|---|---|---|
| 2005/0207104 A1* | 9/2005 | Love | G06F 1/1681 361/679.07 |
| 2005/0225667 A1* | 10/2005 | Yamakose | H04N 5/2252 348/373 |

(Continued)

FOREIGN PATENT DOCUMENTS

| | | |
|---|---|---|
| CN | 206323415 | 7/2017 |
| TW | 200823625 | 6/2008 |

OTHER PUBLICATIONS

"Office Action of Taiwan Counterpart Application," dated Oct. 8, 2019, p. 1-p. 4.

*Primary Examiner* — Marin Pichler
*Assistant Examiner* — Alberto J Betancourt
(74) *Attorney, Agent, or Firm* — JCIPRNET

(57) ABSTRACT

An electronic device including a casing and a lens module is provided. The casing has a receiving groove. The lens module is assembled to the casing in a multiple-axial manner, located in the receiving groove and capable of rotating in a range of −90 degrees to 90 degrees relative to the casing. By assembling the lens module to the casing through a multiple-axial manner, the gap between the lens module and the casing can be reduced, and the appearance of the simple electronic device can be created.

17 Claims, 7 Drawing Sheets

(56) References Cited

U.S. PATENT DOCUMENTS

| | | | |
|---|---|---|---|
| 2005/0235458 A1* | 10/2005 | Zou | G06F 1/1681 |
| | | | 16/287 |
| 2006/0104015 A1 | 5/2006 | Fu et al. | |
| 2006/0152614 A1 | 7/2006 | Wang et al. | |
| 2007/0101544 A1* | 5/2007 | Hsieh | E05D 11/06 |
| | | | 16/342 |
| 2007/0110430 A1* | 5/2007 | Shi | G03B 29/00 |
| | | | 396/428 |
| 2008/0074835 A1* | 3/2008 | Yu | G06F 1/1616 |
| | | | 361/679.27 |

* cited by examiner

ELECTRONIC DEVICE

CROSS REFERENCE TO RELATED APPLICATION

This application claims the priority benefit of U.S. provisional application Ser. No. 62/618,629, filed on Jan. 18, 2018. The entirety of the above-mentioned patent application is hereby incorporated by reference herein and made a part of specification.

BACKGROUND

Technical Field

The invention relates to an electronic device.

Description of Related Art

Along with advancement of manufacturing technology for research and development of computers, computing speed and performance of notebook computers are significantly enhanced. In addition to the integration of speakers, bluetooth, CD players, burners, data modems, and card readers in notebook computers, lenses are also installed so as to be used for providing real-time video function when notebook computers are connected to the Internet.

In the related art, in a notebook computer featuring a built-in lens, the lens is usually disposed at the central position of the edge of the top portion of the screen. The disadvantage of such arrangement is that the position of the lens is fixed, and the viewing angle is also fixed and cannot be adjusted, so a user may feel less convenient when using the lens.

SUMMARY

The invention provides an electronic device featuring a lens module capable of rotating relative to a casing.

An electronic device provided by the invention includes a casing and a lens module, the casing has a receiving groove, and the lens module is assembled to the casing in a multiple-axial manner, located in the receiving groove, and capable of rotating in a range of −90 degrees to 90 degrees relative to the casing.

In an embodiment of the invention, the lens module includes a flipping cover, a lens, and a plurality of pivot assemblies. The flipping cover has a body portion, a pair of axis switching grooves and a pair of securing ends, where the securing ends are located at two sides of the body portion, and the axis switching grooves are located between the securing ends and the body portion; the lens is disposed on the body; the pivot assemblies are disposed corresponding to the axis switching grooves and are pivotally connected between the flipping cover and the casing in the multiple-axial manner, so that the lens disposed on the body portion of the flipping cover is capable of rotating in the range of −90 degrees to 90 degrees relative to the casing.

In an embodiment of the invention, each of the pivot assemblies includes a securing block, a first rotating block, a second rotating block, a first rotating shaft, a second rotating shaft, a third rotating shaft, and a fourth rotating shaft. One securing block is disposed corresponding to one axis switching groove; the first rotating block is located between the securing block and the securing end; the second rotating block is located between the securing block and the body portion; the first rotating shaft pivotally connects the first rotating block and the securing end; the second rotating shaft pivotally connects the securing block and the second rotating block; the third rotating shaft pivotally connects the first rotating block and the securing block; the fourth rotating shaft pivotally connects the second rotating block and the body portion.

In an embodiment of the invention, the first rotating shaft is inserted in a first shaft bore of the securing end and a second shaft bore of the first rotating block, the second rotating shaft is inserted in a third shaft bore of the securing block and a fourth shaft bore of the second rotating block, the third rotating shaft is inserted in a fifth shaft bore of the first rotating block and a sixth shaft bore of the securing block, and the fourth rotating shaft is inserted in a seventh shaft bore of the second rotating block and an eighth shaft bore of the body portion.

In an embodiment of the invention, the first rotating shaft and the second rotating shaft are co-axially arranged, and the third rotating shaft and the fourth rotating shaft are co-axially arranged.

In an embodiment of the invention, the first rotating shaft and the flipping cover are integrally formed, and the fourth rotating shaft and the flipping cover are integrally formed.

In an embodiment of the invention, the second rotating shaft, the third rotating shaft, and the securing block are integrally formed.

In an embodiment of the invention, the second rotating shaft and the second rotating block are integrally formed, and the third rotating shaft and the first rotating block are integrally formed.

In an embodiment of the invention, the lens faces the casing at 0 degree and is shielded by the casing.

In an embodiment of the invention, the casing is a casing of a display of a notebook computer.

To sum up, since the lens module is assembled to the casing in the multiple-axial manner in the electronic device, the lens module is capable of rotating in the range of −90 degrees to 90 degrees relative to the casing and is capable of capturing scenes in front and in back of the casing 110.

To make the aforementioned more comprehensible, several embodiments accompanied with drawings are described in detail as follows.

DESCRIPTION OF THE EMBODIMENTS

Figure 1:
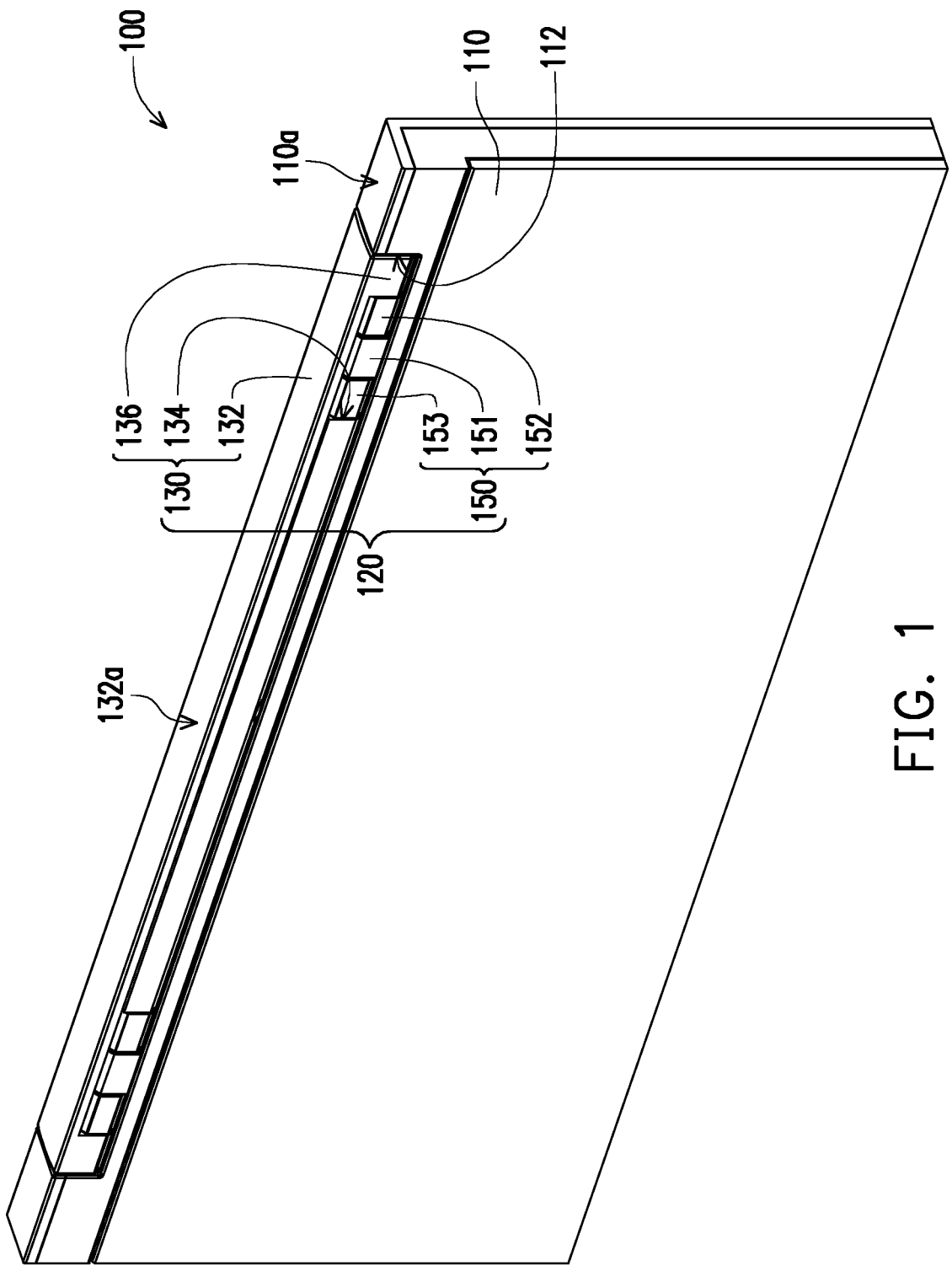
FIG. 1 is a schematic view of an electronic device of the invention.

FIG. 1 is a schematic view of an electronic device of the invention. With reference to FIG. 1, an electronic device 100 is, for example, a notebook computer and includes a casing 110 and a lens module 120, wherein the casing 110 may be a casing of a display of a notebook computer, the casing 110 has a receiving groove 112, and the lens module 120 is assembled to the casing 110 in a multiple-axial manner and is located in the receiving groove 112. Since the lens module 120 is assembled to the casing 110 in the multiple-axial manner, the lens module 120 is capable of rotating in a range of −90 degrees to 90 degrees relative to the casing 110, so as to capture a scene in front of or in back of the casing 110 according to a rotating angle.

Figure 2:
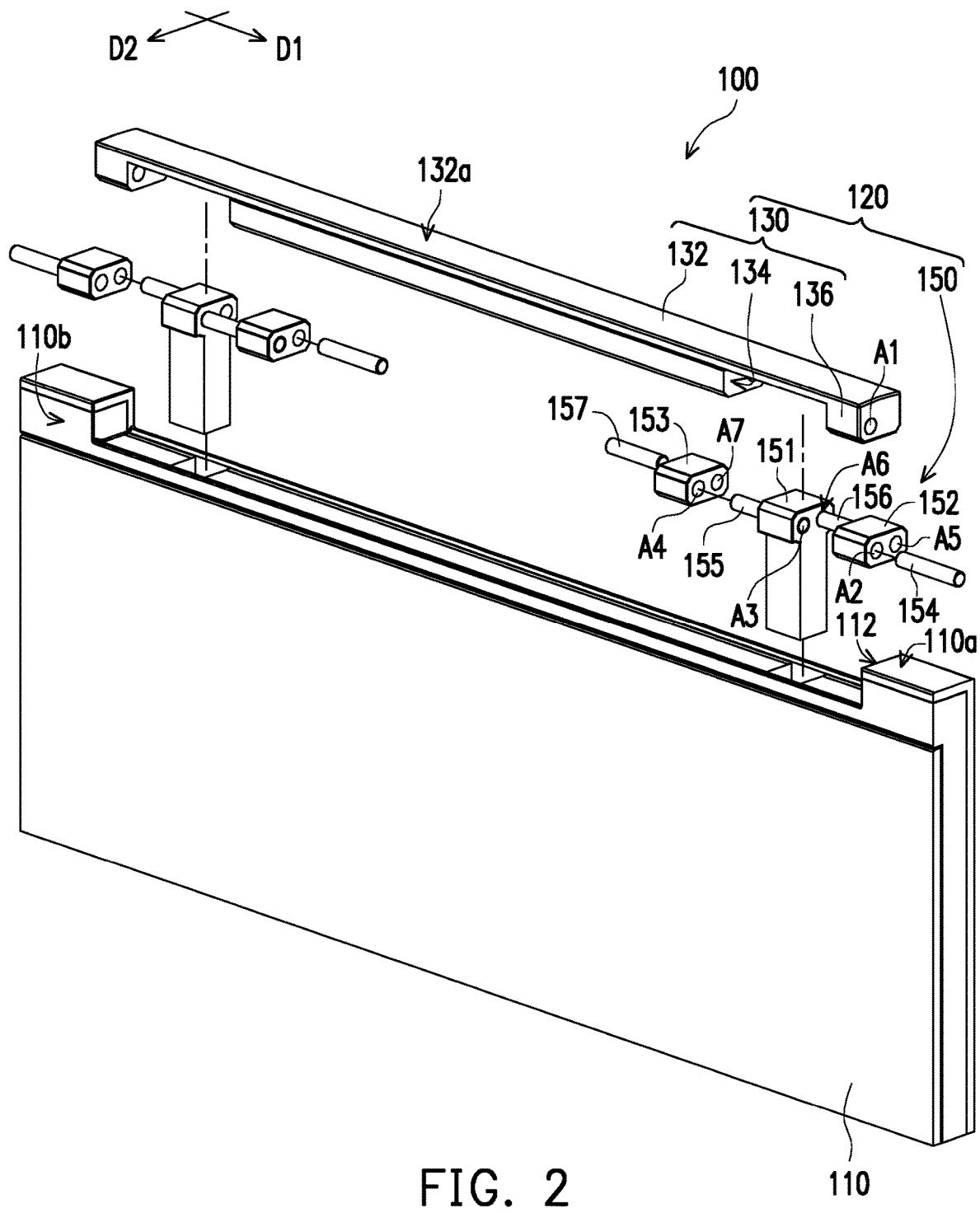
FIG. 2 is a schematic exploded view of the electronic device of FIG. 1.

FIG. 2 is a schematic exploded view of the electronic device of FIG. 1. With reference to FIG. 1 and FIG. 2 together, the lens module 120 includes a flipping cover 130, a lens 140, and a plurality of pivot assemblies 150 (a number of the pivot assemblies 150 in this embodiment is exemplified as 2). The flipping cover 130 has a body portion 132, a pair of axis switching grooves 134, and a pair of securing ends 136. The securing ends 136 are located at two sides of the body portion 132, the securing ends 136 may be secured to the casing 110, and the axis switching grooves 134 are located between the securing ends 136 and the body portion 132; the lens 140 is disposed on the body 132 and is capable of changing an angle relative to the casing 110 along with movement of the flipping cover 130; the pivot assemblies 150 are disposed corresponding to the axis switching grooves 134 and are pivotally connected between the flipping cover 130 and the casing 110 in the multiple-axial manner, so that the lens 140 disposed on the body portion 132 of the flipping cover 130 is capable of rotating in the range of −90 degrees to 90 degrees relative to the casing 110.

In this embodiment, each of the pivot assemblies 150 includes a securing block 151, a first rotating block 152, a second rotating block 153, a first rotating shaft 154, a second rotating shaft 155, a third rotating shaft 156, and a fourth rotating shaft 157. The first rotating block 152, the securing block 151, and the second rotating block 153 are assembled in a length direction D1. One of the securing blocks 151 is disposed corresponding to one axis switching groove 134, the first rotating block 152 is located between the securing block 151 and the securing end 136, the second rotating block 153 is located between the securing block 151 and the body portion 132, the first rotating shaft 154 pivotally connects the first rotating block 152 and the securing end 136, the second rotating shaft 155 pivotally connects the securing block 151 and the second rotating block 153, the third rotating shaft 156 pivotally connects the first rotating block 152 and the securing block 151, and the fourth rotating shaft 157 pivotally connects the second rotating block 153 and the body portion 132.

The first rotating block 152 and the second rotating block 153 are rectangular-shaped, and edges of the rotating blocks may be rounded according to needs, so that sharpness of the edges is reduced and rotation is performed more smoothly. In addition, each of the rotating blocks has two shaft bores disposed in parallel in a width direction D2.

Figure 3:
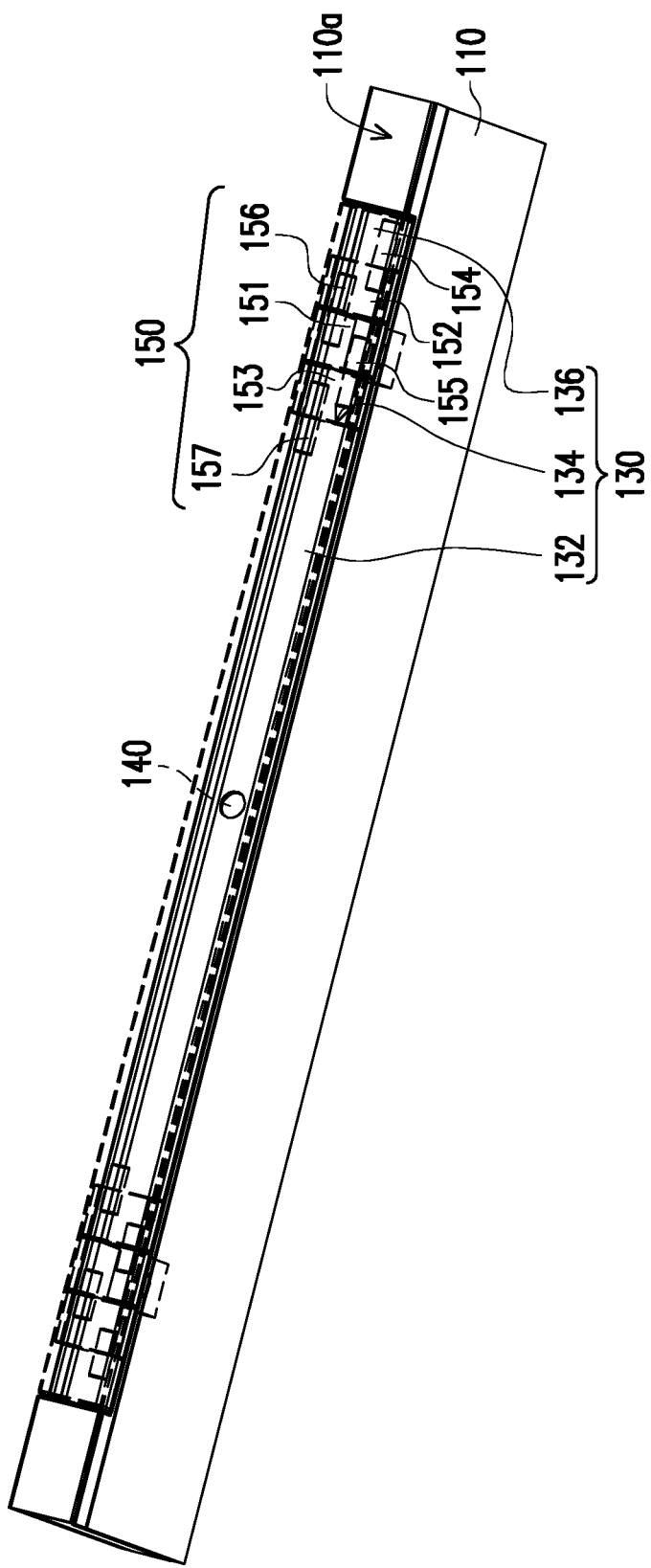
FIG. 3 is a perspective view of a portion of FIG. 1.

FIG. 3 is a perspective view of a portion of FIG. 1. With reference to FIG. 1, FIG. 2, and FIG. 3 together, the securing end 136, the securing block 151, the first rotating block 152 and the second rotating block 153 have shaft bores for the rotating shafts to be inserted in. Specifically, the first rotating shaft 154 is inserted in a first shaft bore A1 of the securing end 136 and a second shaft bore A2 of the first rotating block 152, the second rotating shaft 155 is inserted in a third shaft bore A3 of the securing block 151 and a fourth shaft bore A4 of the second rotating block 153, the third rotating shaft 156 is inserted in a fifth shaft bore A5 of the first rotating block 152 and a sixth shaft bore A6 of the securing block 151, and the fourth rotating shaft 157 is inserted in a seventh shaft bore A7 of the second rotating block 153 and an eighth shaft bore (not shown) of the body portion 132. In addition, the first rotating shaft 154 and the second rotating shaft 155 are co-axially arranged, and the third rotating shaft 156 and the fourth rotating shaft 157 are co-axially arranged.

Through the foregoing arrangement, the pivot assemblies 150 allows the flipping cover 130 to rotate in the multiple-axial manner relative to the casing 110, so that the lens 140 is capable of rotating in the range of −90 degrees to 90 degrees.

Specifically, in a received state, the lens 140 is in a state of 0 degree, the lens 140 downwardly faces the casing 110 and is shielded by the casing 110, a top surface 132a of the flipping cover 130 and a top surface 110a of the casing 110 are aligned, side surfaces of the flipping cover 130, the securing block 151, the first rotating block 152, and the second rotating block 153 and a side surface 110b of the casing 110 are aligned, the electronic device 100 thus exhibits a nearly flat appearance as a whole.

Figure 4:
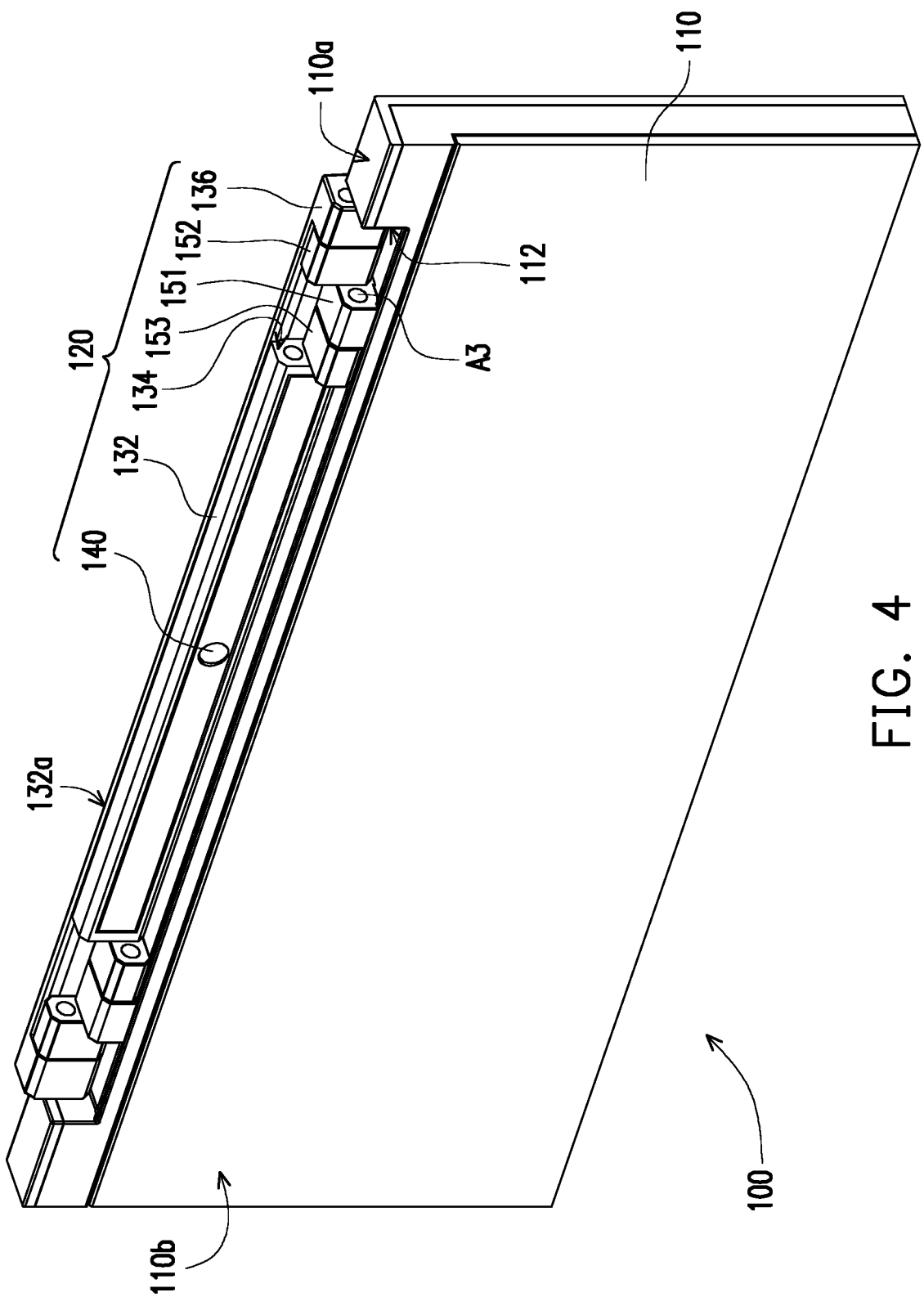
FIG. 4 is a schematic view of a lens module rotating by 90 degrees relative to a casing.
Figure 5:
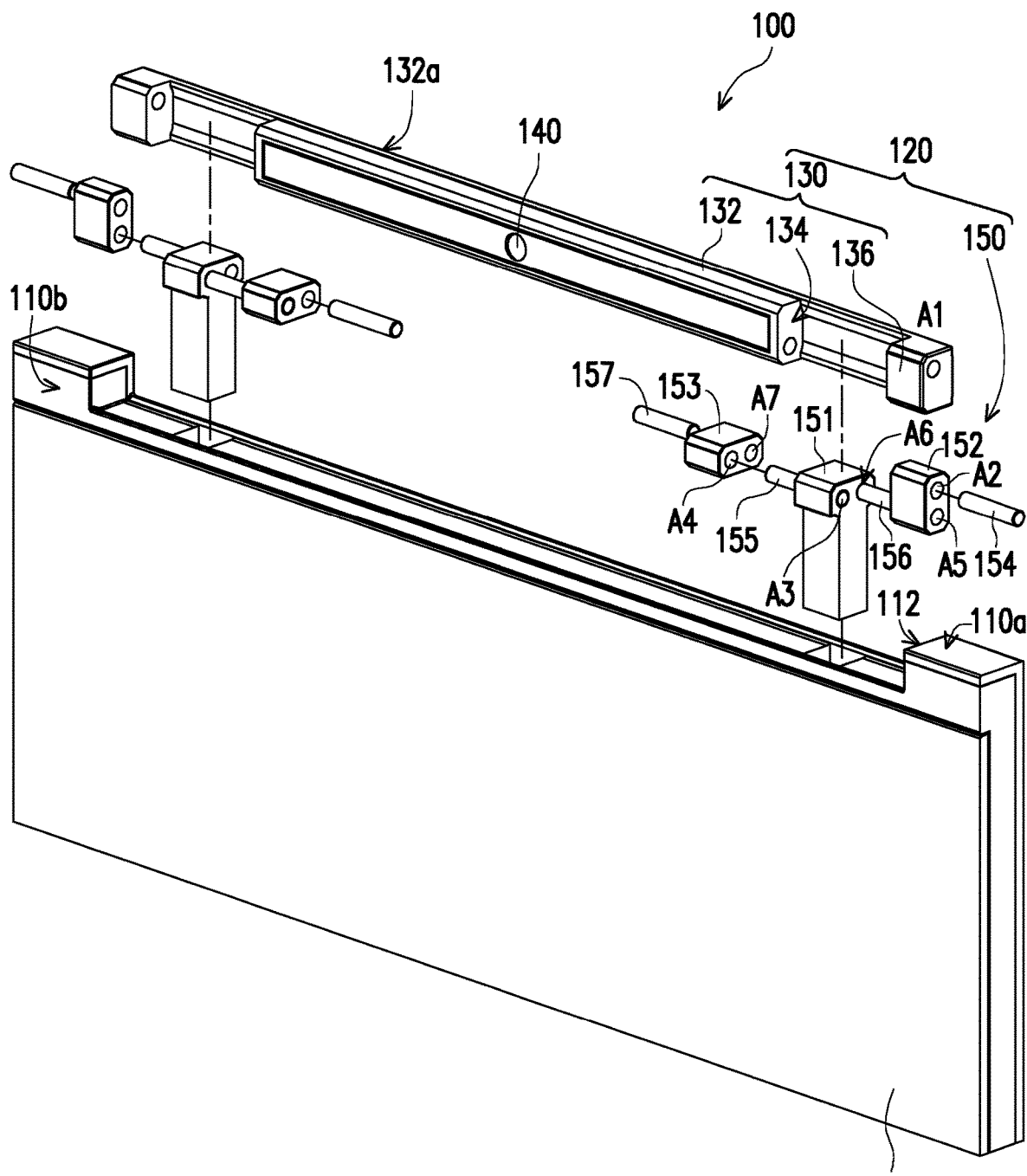
FIG. 5 is a schematic local exploded view of FIG. 4.

FIG. 4 is a schematic view of a lens module rotating by 90 degrees relative to a casing, and FIG. 5 is a schematic local exploded view of FIG. 4. With reference to FIG. 4 and FIG. 5 together, when a user intends to enable the lens 140 to capture a scene in front of the casing 110 (i.e., facing the user), the user's hand may flip to move the flipping cover 130 backwards, so the flipping cover 130 rotates by 90 degrees. Since the first rotating shaft 154 pivotally connects the securing end 136 of the flipping cover 130 and the first rotating block 152, the first rotating shaft 154 is linked up with the securing end 136 of the flipping cover 130. In addition, since the fourth rotating shaft 157 pivotally connects the second rotating block 153 and the body portion 132 of the flipping cover 130 and the third rotating shaft 156 pivotally connects the first rotating block 152 and the securing blocks 151, when the flipping cover 130 rotates by 90 degrees around the co-axially arranged fourth rotating shaft 157 and the third rotating shaft 156 acting as an axle center, the first rotating block 152 is linked up with the flipping cover 130 and the first rotating block 152 rotates by 90 degrees around the third rotating shaft 156 acting as an axle center.

At this time, the second rotating block 153 pivotally connected to the securing block 151 through the second rotating shaft 155 is not linked up with the flipping cover 130. In short, when the flipping cover 130 rotates by 90 degrees, the second rotating block 153 remains unmoved.

When the lens 140 is not in use, the flipping cover 130 may be flipped to move again so that the flipping cover 130 is restored to an original position, and the lens 140 downwardly faces the casing 110.

Figure 6:
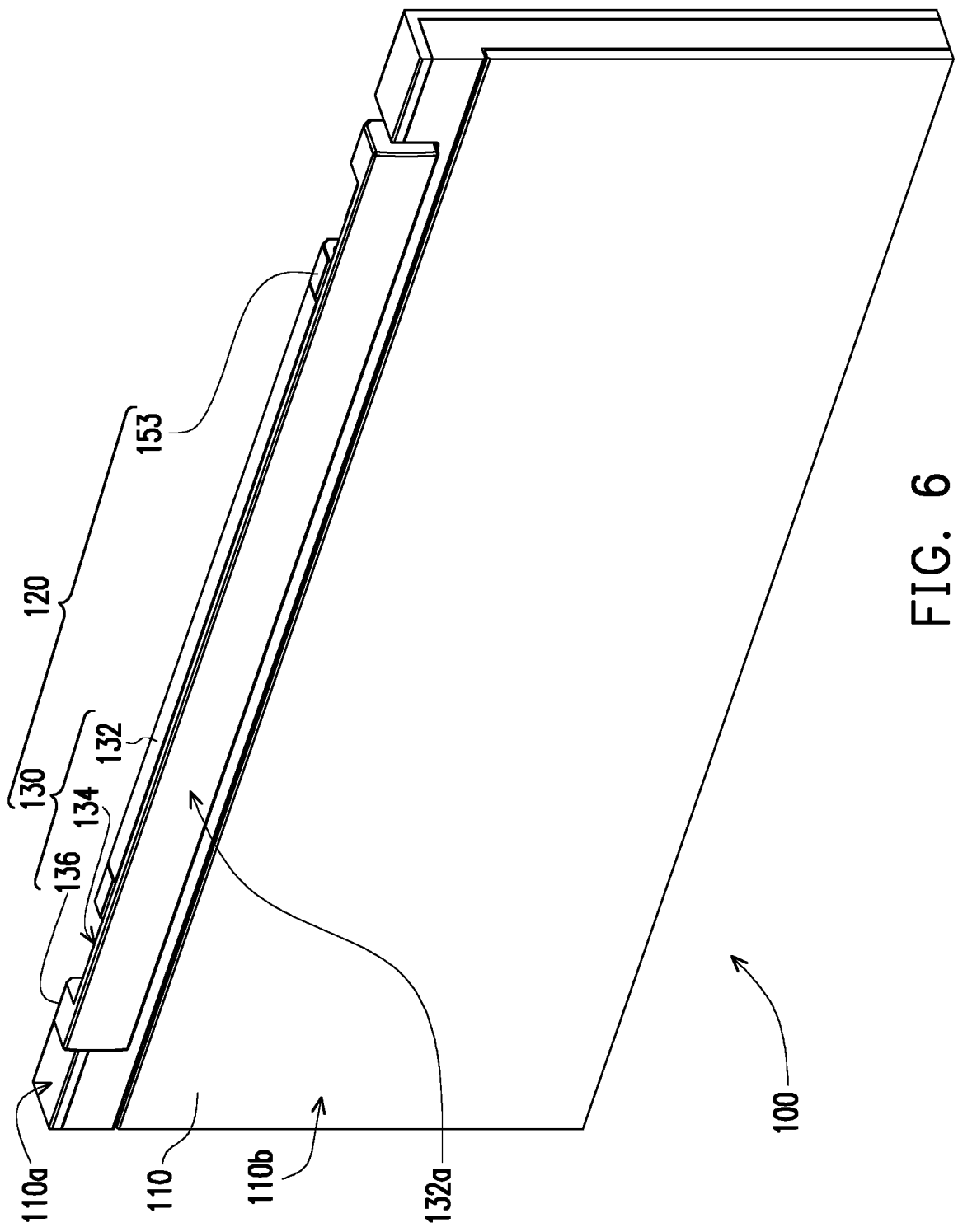
FIG. 6 is a schematic view of the lens module rotating by −90 degrees relative to the casing.
Figure 7:
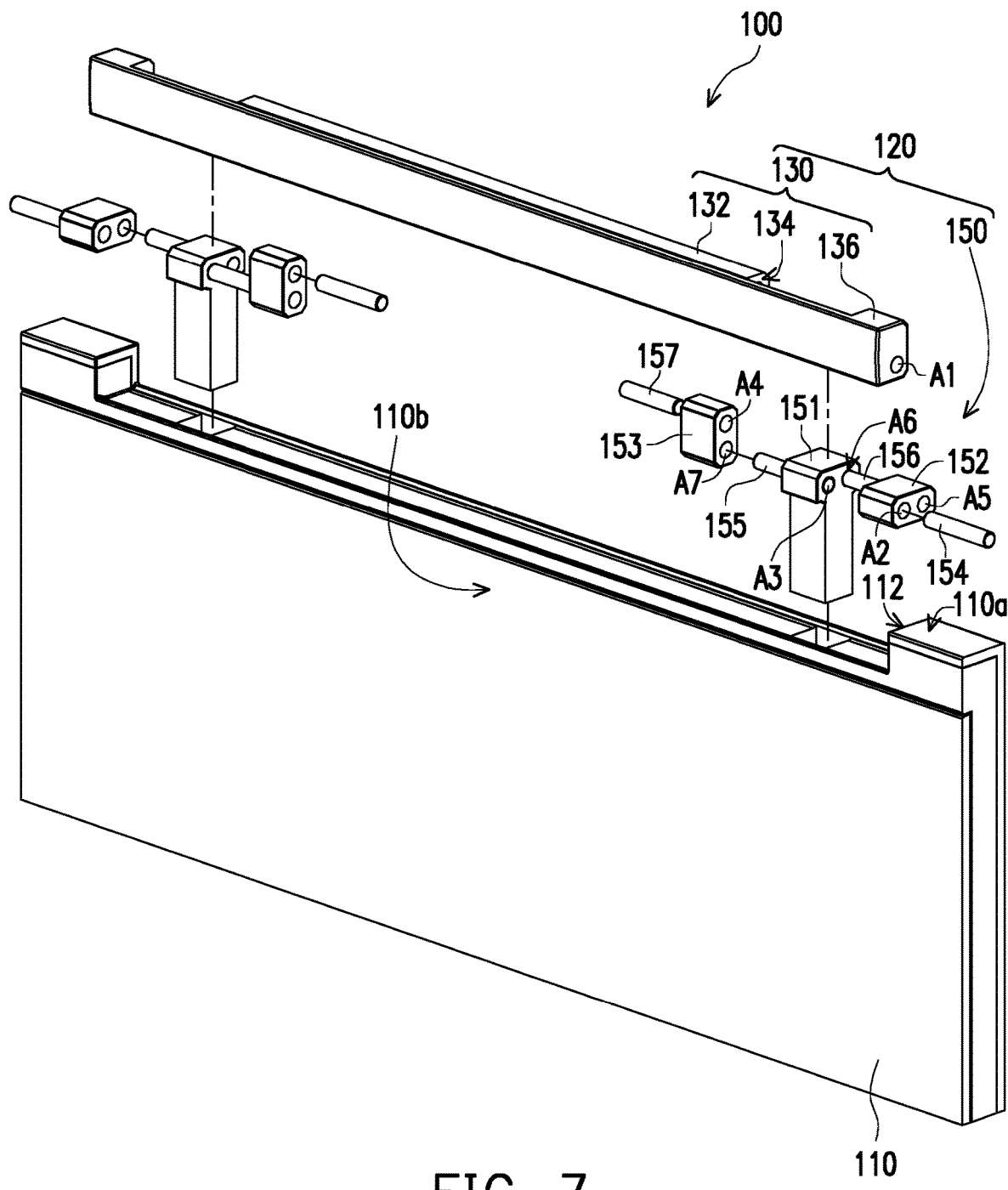
FIG. 7 is a schematic local exploded view of FIG. 6.

FIG. 6 is a schematic view of the lens module rotating by −90 degrees relative to the casing, and FIG. 7 is a schematic local exploded view of FIG. 6. With reference to FIG. 6 and FIG. 7 together, when the lens 140 is to capture a scene in back of the casing 110 (i.e., facing an opposite direction of the user), the user's hand may flip to move the flipping cover 130 forwards, so the flipping cover 130 rotates by −90 degrees. Since the fourth rotating shaft 157 pivotally connects the body portion 132 of the flipping cover 130 and the second rotating block 153, the second rotating shaft 155 is linked up with the body portion 132 of the flipping cover 130. In addition, since the first rotating shaft 154 pivotally connects the first rotating block 152 and the securing end 136 of the flipping cover 130 and the second rotating shaft 155 pivotally connects the second rotating block 153 and the securing block 151, when the flipping cover 130 rotates by 90 degrees around the co-axially arranged second rotating shaft 155 and the first rotating shaft 154 acting as an axle center, the second rotating block 153 is linked up with the flipping cover 130 and the second rotating block 153 rotates by 90 degrees around the second rotating shaft 155 acting as an axle center.

At this time, the first rotating block 152 pivotally connected to the securing block 151 through the third rotating shaft 156 is not linked up with the flipping cover 130. In short, when the flipping cover 130 rotates by 90 degrees, the first rotating block 152 remains unmoved.

In thus can be seen that through arrangement in the multiple-axial manner (the co-axially arranged first rotating shaft 154 and the second rotating shaft 155 and the co-axially arranged third rotating shaft 156 and the fourth rotating shaft 157), when rotating forwards or backwards relative to the casing 110, the flipping cover 130 uses different rotating shaft combinations (the co-axially arranged first rotating shaft 154 and the second rotating shaft 155, or the co-axially arranged third rotating shaft 156 and the fourth rotating shaft 157) to perform rotating. The lens 140 can thereby feature a rotating angle of −90 degrees to 90 degrees (i.e., 0 degree to 180 degrees), so as to capture the scene in front of the casing 110 facing the user or the scene in back of the casing 110 facing an opposite direction of the user according to needs of the user.

Incidentally, in the foregoing embodiments, each of the first rotating shaft 154 to the fourth rotating shaft 157 may be an individual part, but in other embodiments, the first rotating shaft and the flipping cover 130 may be integrally formed, and the fourth rotating shaft 157 and the flipping cover 130 may be integrally formed.

Alternatively, the second rotating shaft 155, the third rotating shaft 156, and the securing block 151 may all be integrally formed.

Further, the second rotating shaft 155 and the second rotating block 153 may be integrally formed, and the third rotating shaft 156 and the first rotating block 152 may be integrally formed.

Based on the above, the rotating shafts may correspondingly be integrally formed with the securing block 151 or the rotating blocks according to needs, so that the number of parts is reduced, and the assembly process is simplified.

Incidentally, although the electronic device 100 in this embodiment is exemplified as a notebook computer, the electronic device 100 may also be a tablet computer, and is not limited to the description provided in this embodiment.

In view of the foregoing, since the lens module 120 is assembled to the casing 110 in the multiple-axial manner in the electronic device provided by the invention, the lens module 120 is capable of rotating in the range of −90 degrees to 90 degrees relative to the casing 110 and is capable of capturing objects in front and in back of the casing 110.

In addition, with such arrangement, the lens module is kept to be disposed at top portion of a display and is not required to be disposed on a body portion with a keyboard, and the lens module in the received state may present an integral appearance together with the casing 110, instead of protruding from the casing 110 of the display.

Further, with such arrangement, a gap between the lens module and the casing 110 can be reduced, a simple appearance is thus created for the electronic device, and an upper edge of the display features a reduced frame thickness.

Moreover, when the lens module is in the received state, the lens is internally hidden without being exposed, so even the electronic device is hacked, the lens cannot be used to spy user's activities, and that privacy security of the user is therefore enhanced.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An electronic device, comprising:
   a casing, having a receiving groove;
   a lens module, assembled to the casing in a multiple-axial manner, located in the receiving groove, capable of rotating in a range of −90 degrees to 90 degrees relative to the casing, wherein the lens module comprises a flipping cover and a plurality of pivot assemblies, the flipping cover having a body portion, a pair of securing ends located at two sides of the body portion, and a pair of axis switching groove located between the securing ends and the body portion,
   wherein the plurality of pivot assemblies pivotally connected between the flipping cover and the casing, wherein each of the pivot assemblies comprises a securing block, and the securing block is disposed corresponding to one of the axis switching grooves.

2. The electronic device as claimed in claim 1, wherein the lens module
   has a lens, the lens is disposed on the body portion; and
   the plurality of pivot assemblies pivotally connected between the flipping cover and the casing in the multiple-axial manner so that the lens disposed on the body portion of the flipping cover rotates in the range of −90 degrees to 90 degrees relative to the casing.

3. The electronic device as claimed in claim 2, wherein each of the pivot assemblies comprises:
   a first rotating block, located between the securing block and the securing end;
   a second rotating block, located between the securing block and the body portion;
   a first rotating shaft, pivotally connecting the first rotating block and the securing end;
   a second rotating shaft, pivotally connecting the securing block and the second rotating block;
   a third rotating shaft, pivotally connecting the first rotating block and the securing block; and
   a fourth rotating shaft, pivotally connecting the second rotating block and the body portion.

4. The electronic device as claimed in claim 3, wherein the first rotating shaft is inserted in a first shaft bore of the securing end and a second shaft bore of the first rotating block, the second rotating shaft is inserted in a third shaft bore of the securing block and a fourth shaft bore of the second rotating block, the third rotating shaft is inserted in a fifth shaft bore of the first rotating block and a sixth shaft bore of the securing block, and the fourth rotating shaft is inserted in a seventh shaft bore of the second rotating block and an eighth shaft bore of the body portion.

5. The electronic device as claimed in claim 3, wherein the first rotating shaft and the second rotating shaft are co-axially arranged, and the third rotating shaft and the fourth rotating shaft are co-axially arranged.

6. The electronic device as claimed in claim 3, wherein the first rotating shaft and the flipping cover are integrally formed, and the fourth rotating shaft and the flipping cover are integrally formed.

7. The electronic device as claimed in claim 3, wherein the second rotating shaft, the third rotating shaft, and the securing block are integrally formed.

8. The electronic device as claimed in claim 3, wherein the second rotating shaft and the second rotating block are integrally formed, and the third rotating shaft and the first rotating block are integrally formed.

9. The electronic device as claimed in claim 2, wherein the lens faces the casing at 0 degree and is shielded by the casing.

10. The electronic device as claimed in claim 1, wherein the casing is a casing of a display of a notebook computer.

11. The electronic device as claimed in claim 1, wherein the lens module comprises:
a lens disposed on the body portion.

12. The electronic device as claimed in claim 1, wherein each of the pivot assemblies comprises:
a first rotating block, located between the securing block and the securing end.

13. The electronic device as claimed in claim 12, wherein each of the pivot assemblies comprises:
a first rotating shaft, pivotally connecting the first rotating block and the securing end.

14. The electronic device as claimed in claim 12, wherein each of the pivot assemblies comprises:
a third rotating shaft, pivotally connecting the first rotating block and the securing block.

15. The electronic device as claimed in claim 1, wherein each of the pivot assemblies comprises:
a second rotating block, located between the securing block and the body portion.

16. The electronic device as claimed in claim 15, wherein each of the pivot assemblies comprises:
a second rotating shaft, pivotally connecting the securing block and the second rotating block.

17. The electronic device as claimed in claim 15, wherein each of the pivot assemblies comprises:
a fourth rotating shaft, pivotally connecting the second rotating block and the body portion.

* * * * *